Figure 1:
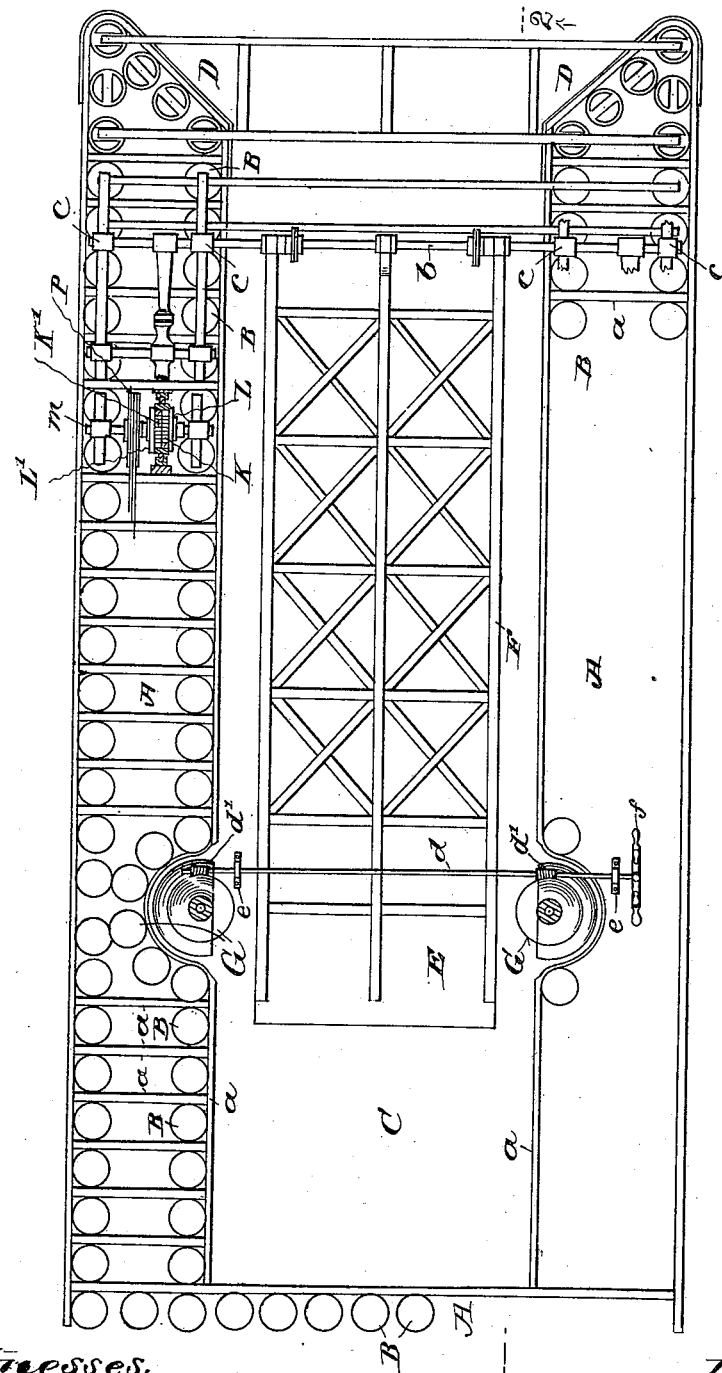

No. 703,998. Patented July 8, 1902.
E. CHAQUETTE.
WAVE MOTOR.
(Application filed July 27, 1901.)
(No Model.) 2 Sheets—Sheet 1.

Witnesses.
Inventor
Ephraim Chaquette

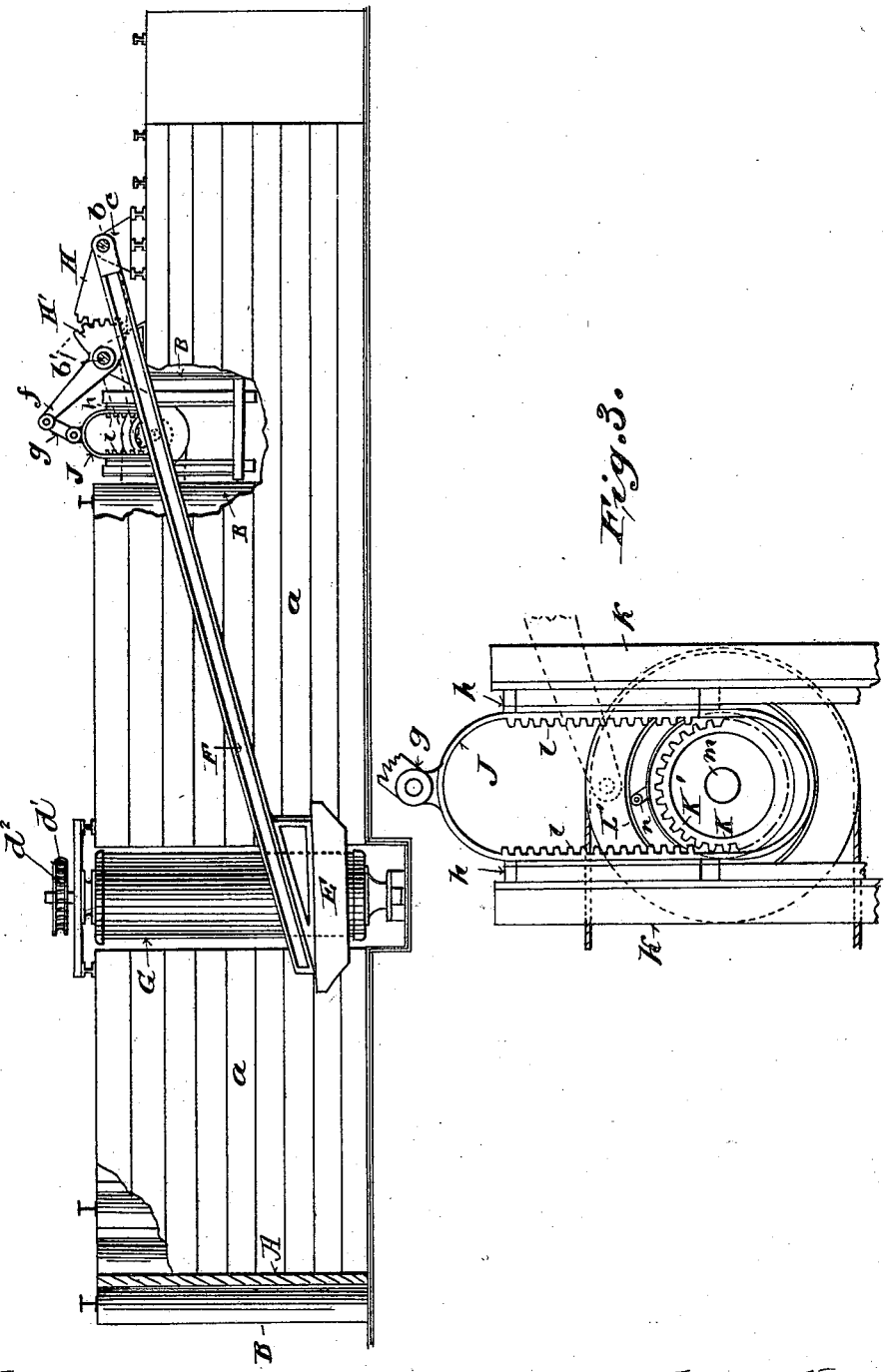

UNITED STATES PATENT OFFICE.

EPHRAIEM CHAQUETTE, OF NEW ROCHELLE, NEW YORK.

WAVE-MOTOR.

SPECIFICATION forming part of Letters Patent No. 703,998, dated July 8, 1902.

Application filed July 27, 1901. Serial No. 69,880. (No model.)

*To all whom it may concern:*

Be it known that I, EPHRAIEM CHAQUETTE, a citizen of the United States, and a resident of New Rochelle, county of Westchester, State of New York, have invented certain new and useful Improvements in Wave-Motors, of which the following is a specification.

The object of my invention is to provide an apparatus by means of which the lifting power of waves on the sea-shore is converted into the constant rotation of a power-shaft. To accomplish this object, I employ a suitable float and a specially-constructed pier surrounding a waterway preferably open only at one end, so that the incoming water may bank up to a greater height under the float. I provide means for expanding or contracting the width of this waterway in the neighborhood of the float to accommodate it to the varying force of the sea, and I provide novel means for utilizing both the up and down motion of the float and converting such motion into a rotation constantly in one direction.

One form of my invention is shown in the accompanying drawings, in which—

Figure 1 is a top plan. Fig. 2 is a vertical longitudinal section. Fig. 3 is an enlarged detail of the converting mechanism.

Same letters indicate similar parts in the different figures.

A is the pier or bulkhead formed by means of the piles or posts B, inclosed by the framework $a$ $a$, so as to leave a waterway C, inclosed on all sides except at the mouth D, which is preferably flaring. The piles B are preferably made as hollow iron tubes filled with cement, this constituting a substantial and permanent structure.

E is a float hung at the outer end of the frame F, the inner end of which is keyed to a rock-shaft $b$, journaled in the framework of the pier, as shown at $c$ $c$. As the water in the waterway rises it lifts the float $e$, and this rocks the shaft $b$ in one direction, while the falling of the float as the water recedes rocks the shaft in the other direction. To quicken the rise and fall of the float when the wave motion is slight, revolving gates G are provided, by which the passage at the sides of the float may be diminished or enlarged, as occasion requires. These gates consist of somewhat-semicylindrical structures connected by the bar $d$ and revolubly mounted at each side of the waterway, so that when in the position shown in Fig. 1 they offer no impediment to the flow of water therein. By turning these gates so that their rounded surface projects into the waterway the width of the latter is diminished as desired, thus banking up the water under the float and causing it to rise and descend more quickly. The turning of the gates is brought about as follows: The bar $d$ carries two worms $d'$ $d'$ and is journaled in the boxes $e$ $e$, mounted on the pier. This bar is turned by the hand-wheel $f$ or by connection (not shown) with any convenient source of power. The worms $d'$ $d'$ engage, respectively, with the worm-gears $d^2$ $d^2$, mounted on the shafts on which the gates G G are mounted.

The rock-shaft $b$ carries the sector-rack H, the teeth of which mesh with a corresponding sector H, mounted upon the lifting-shaft $b$, journaled in the framework of the pier. The sector H is provided with an arm $f$, the outer end of which is attached by the link $g$ to the lifting-rack J. The motor-rack, as shown in the enlarged detail in Fig. 3, slides on the vertical tracks $h$, secured to the frame or posts $k$, which form a part of the pier A. The rack is provided with the teeth $l$ $l$, those on one side engaging with the toothed gear K and those on the other side with the toothed gear K'. These gears are loose upon the shaft $m$, journaled in the framework of the pier, and are both revolved by the up-and-down motion of the rack. The shaft $m$ carries two clutch-gears L L', so set that one of them lies idle during the downward movement of the rack, but is picked up by the dog $n$ during the upward motion of the rack, and thus communicates the rotation of the corresponding gears K or K' to the shaft $m$. The dog on the other clutch-pulley is so set that the reverse of this takes place, the pulley being idle during the upper motion of the rack and operative during the downward motion. By this means every motion of the rack J, either up or down, is utilized to rotate the shaft $m$ always in the same direction. The relations and proportions of the two racks, sectors H and H', and the motor-rack J are such that the least rise or fall of the float E will turn the shaft $m$ by at least one tooth of the gear K K'. My apparatus therefore avoids the difficulty usual in wave-motors that there should not be sufficient throw to produce continuous operation. The shaft $m$ becomes the power-shaft and carries the pulley P or other suitable device for transmitting its rotation to any mechanism which it may be desired to operate.

The operation of my wave-motor is as follows: An inrushing wave enters the waterway C through the flaring mouth D and lifts the float E to a height corresponding to the depth of the water admitted. The rising of the float rocks the shaft $b$, and the sector H moves upward accordingly. The sector H', meshing therewith, moves upward, thus depressing the arm $f$, link $g$, and rack J. This downward motion of the rack turns the loose gears K K', of which one, K, turns from, while the other, K', with the aid of the dog $n$, clutches the pulley L' and turns the shaft $m$, on which it is mounted. As soon as the water begins to recede the float E begins to fall, rocking the shaft $b$ the other way, which produces an upper motion of the motor-rack J. The gear K' is now idle; but the gear K operates the clutch-pulley L, thus continuing the rotation of the shaft $m$ in the same direction.

I claim—

1. A wave-motor which consists of piers inclosing a waterway on three sides, a pair of water-gates situated therein and adapted to control said waterway in the vicinity of the float; and a float set in said waterway and mechanism connected therewith whereby the rising and falling of the float is converted into a continuous rotation of a power-shaft.

2. A wave-motor which is provided with a pair of water-gates of somewhat-semicylindrical character connected together for simultaneous operation and situated in the waterway in such manner that when turned in one position they tend to choke the waterway and bank up the water therein and when turned into the opposite position, offer no impediment to the flow of water through said waterway.

EPHRAIEM CHAQUETTE.

Witnesses:
W. P. PREBLE, Jr.,
RAE BATTERSBY.